United States Patent [19]

Charmier et al.

[11] Patent Number: 5,779,970
[45] Date of Patent: Jul. 14, 1998

[54] CONVECTION COOKING OVEN WITH A COOLED INTERIOR

[75] Inventors: Francois Charmier, Voreppe; Philippe Breme, Voiron, both of France

[73] Assignee: Aluminium Pechiney, Courbevoie, France

[21] Appl. No.: 592,631

[22] Filed: Jan. 26, 1996

[30] Foreign Application Priority Data

Jan. 27, 1995 [FR] France .................. 95 01186

[51] Int. Cl.$^6$ .................................. C10B 9/00
[52] U.S. Cl. ............... 266/44; 266/193; 202/211; 432/192
[58] Field of Search ............ 202/211; 266/44, 266/280, 193; 432/192, 18, 190, 212, 213; 15/304

[56] References Cited

U.S. PATENT DOCUMENTS 3,975,149  8/1976  Rancunas et al. ............ 432/212
4,215,982  8/1980  Genevois et al. ............ 432/192
4,266,316  5/1981  Schneider et al. ............ 15/304
4,552,530  11/1985 Gunnes et al. ............... 432/192
4,687,439  8/1987  Olivarez, Jr. et al. ......... 432/192
4,842,511  6/1989  Young .......................... 432/192

FOREIGN PATENT DOCUMENTS 652290     5/1993   Australia .
A-25 19 738 11/1976  Germany .
A-241303   7/1924   United Kingdom .

*Primary Examiner*—Scott Kastler
*Attorney, Agent, or Firm*—Oblon, Spivak, McClelland, Maier & Neustadt, P.C.

[57] ABSTRACT

The invention concerns a baking ring furnace characterized by the fact that the two parallel rows of cooking chambers are separated by a unique central wall or interior film or space which is capable of being specifically cooled and made firmly attached to the bottom of the basin.

11 Claims, 3 Drawing Sheets

CONVECTION COOKING OVEN WITH A COOLED INTERIOR

BACKGROUND OF THE INVENTION

Field of the Invention

The invention concerns a baking ring furnace. This furnace is preferably used to cook carbonaceous compounds and especially suited to cook carbonaceous anodes used in the production of aluminum by electrolysis according to, e.g., the Hall-Heroult process.

BACKGROUND OF THE INVENTION

Baking ring furnaces usually have two rows of parallel juxtaposed chambers of rectangular form in which the cooking of anodes or any other raw carbonaceous product is done. Those chambers, separated by transverse walls, the bottom and lateral walls of which are thermally isolated by insulating bricks, are subdivided into several compartments containing the product ready to be cooked. The compartments are separated by hollow walls made of thin partitions and placed parallel to the major axis of the furnace. In those hollow walls, hot gas circulates with a temperature that can reach 1150° to 1200° C. The hot gas comes mainly from combustion gas generated by one or several burner ramps that are moved from one chamber to the next as the cooking is taking place.

Baking ring furnaces are often distinguished between ones with open chambers and ones with closed chambers. The difference mainly resides in the construction characteristics of the interior brick wall leading to different paths for the hot gas in circulation around the compartments containing the product ready to be cooked, but the general organization of these baking ring furnaces stays the same with two rows of parallel chambers, the length of which can reach 200 meters, linked at their ends by ventilation tubes.

The rows of parallel chambers thermally insulated on three faces (lateral isolation+bottom) are contained in a cement basin-shaped casing formed of a horizontal platform and of two vertical lateral walls. At this stage, two construction modes are possible with their respective advantages and disadvantages, which involve:

- either a single basin enclosing the two rows of chambers and their insulation; this configuration is often adopted in closed chamber type furnaces;
- or a double basin, each basin containing a row of chambers; this configuration is often used for open chamber type furnaces.

This is an important constructive difference which is not necessarily linked to the type of furnace and its chambers; in other words, a closed type furnace with a double basin can easily be made as well as an open type furnace with a single basin.

The advantage of a single basin is its great compactness which is associated with room gain and lower investment cost, but this is to the detriment of good behavior and the longevity of the insulating bricks that are placed between the two rows of chambers. In fact, those bricks bear important thermal as well as mechanical constraints because of the wide range of temperatures used as well as the pressure applied by the chambers situated on each side of the bricks. Because of the difficulties associated with an efficient cooling of this central zone, the cooling of the single basin is limited in most of the industrial furnaces with a single basin to a simple natural ventilation of the walls or exterior walls of the basin. This different thermal treatment of the central zone compared to the exterior ones leads to increased mechanical and thermal constraint created by the important thermal gradient between the opposite chambers situated in the two rows of chambers forming the furnace.

The major advantage of the double basin is that the load constituted by the row of chambers is treated in a symmetrical manner compared to its longitudinal axis. In particular, the interior walls are cooled the same way the exterior ones are in the most common case where there is a natural ventilation performed by circulation ducts which cools the bottom of the furnace. This configuration therefore allows the life of the bricks to be prolonged but is also associated with the inconvenience of a higher starting cost and the need for more floor space for the same production capacity.

The realization of a chamber furnace to cook carbonaceous products having simultaneously the advantages of single basin furnaces and double basin furnaces, that is to say: on one hand a limited size as well as a moderate cost and on the other hand a longer life for the bricks and especially the central ones, is still not a resolved problem for the builder or the user of baking ring furnaces.

OBJECTS OF THE INVENTION

The invention brings a solution to this problem. It concerns more precisely a baking ring furnace which can be used to cook carbonaceous compounds and is made notably of two parallel rows of cooking chambers placed with their own thermal insulation jointly or separately in a basin-shaped casing (hereinafter referred to as a basin), preferably made of cement, cooled by ventilation of the exterior lateral walls characterized by the fact that the two parallel rows of cooking chambers are separated by a unique central wall or interior partition which is specifically cooled and made firmly attached to the bottom of the basin.

The interior partition, the thickness of which varies according to the kind of building material used, is preferably made of a network of vertical, horizontal or any other geometric shape ducts allowing the circulation of a cooling liquid or gaseous fluid allowing the temperature of the building material of the central wall to be lowered to an acceptable value for this particular material. Preferably, the interior partition is made of two vertical walls of identical thickness, symmetrical compared to the vertical axis of symmetry, attached at their lower ends to the bottom of the basin. Those walls are maintained at fixed intervals by vertical or horizontal spacers in order to create vertical or horizontal passages in which the cooling fluid can circulate and which is preferably ventilation air produced by appropriate ventilation means. In general, the spacers are preferably made of the same material as the vertical walls.

The term "appropriate ventilation means" includes natural ventilation means, forced ventilation and mix ventilation. These ventilation means are placed with the other auxiliary means necessary to run the furnace, including the control and regulation means as well as the lifting and handling means, outside the furnace and preferably in the structure housing the furnace.

DETAILED DESCRIPTION OF THE INVENTION

Figure 1:
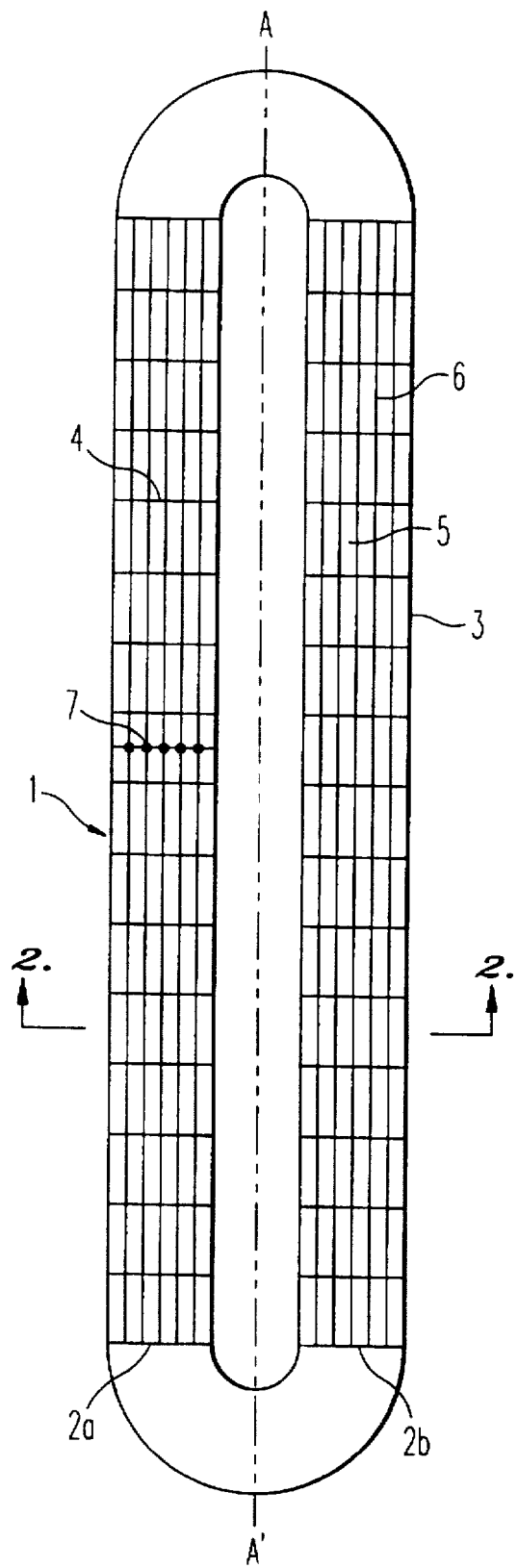

The invention will be better understood using the detailed description illustrated by the following figures:

FIG. 1: schematic representation in a top view of a baking ring furnace according to prior art.

Figure 2:
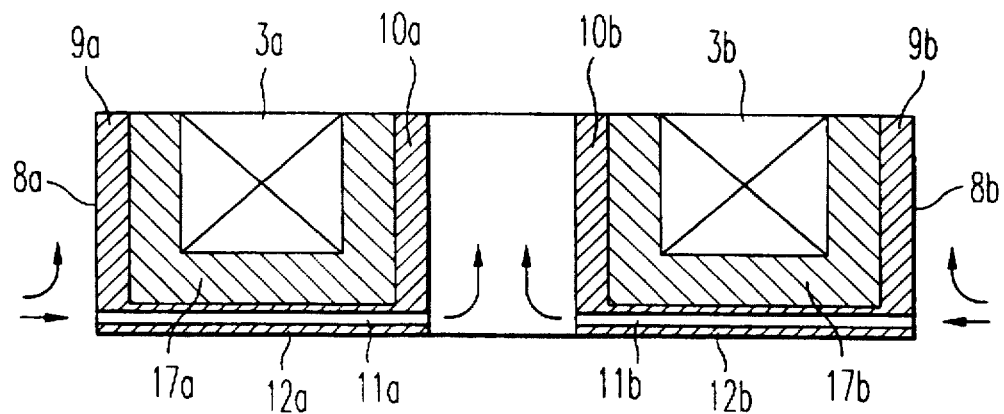

FIG. 2: schematic description in a transversal cut following B, B' of the double basin furnace of FIG. 1 according to the prior art.

Figure 3:
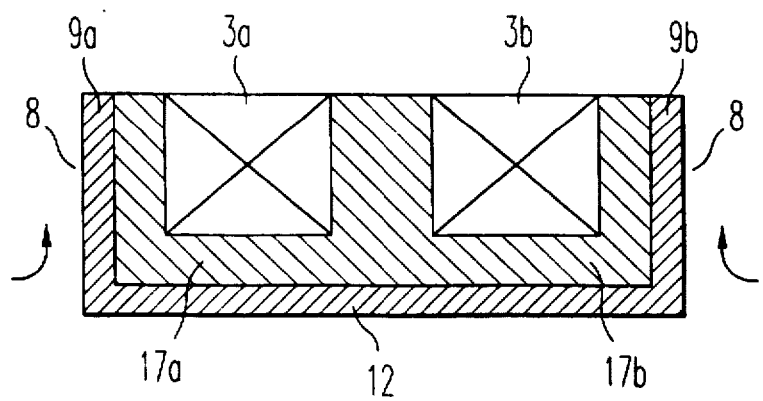

FIG. 3: schematic description in a transversal cut of a single basin furnace according to the prior art.

Figure 4:
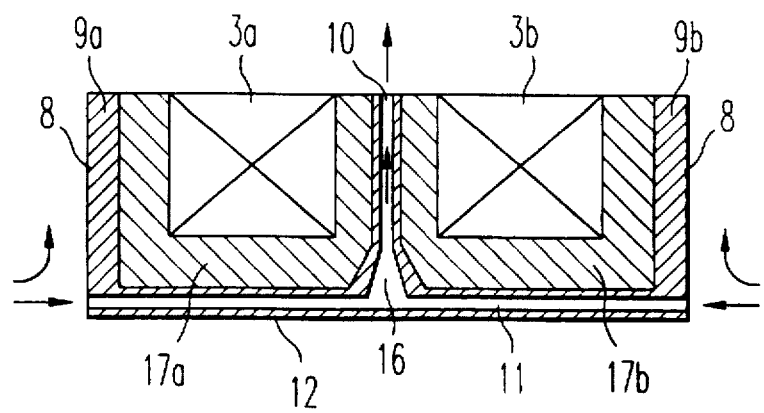

FIG. 4: schematic description in a transversal cut of a baking ring furnace with an internal partition ventilated according to the invention.

Figure 5:
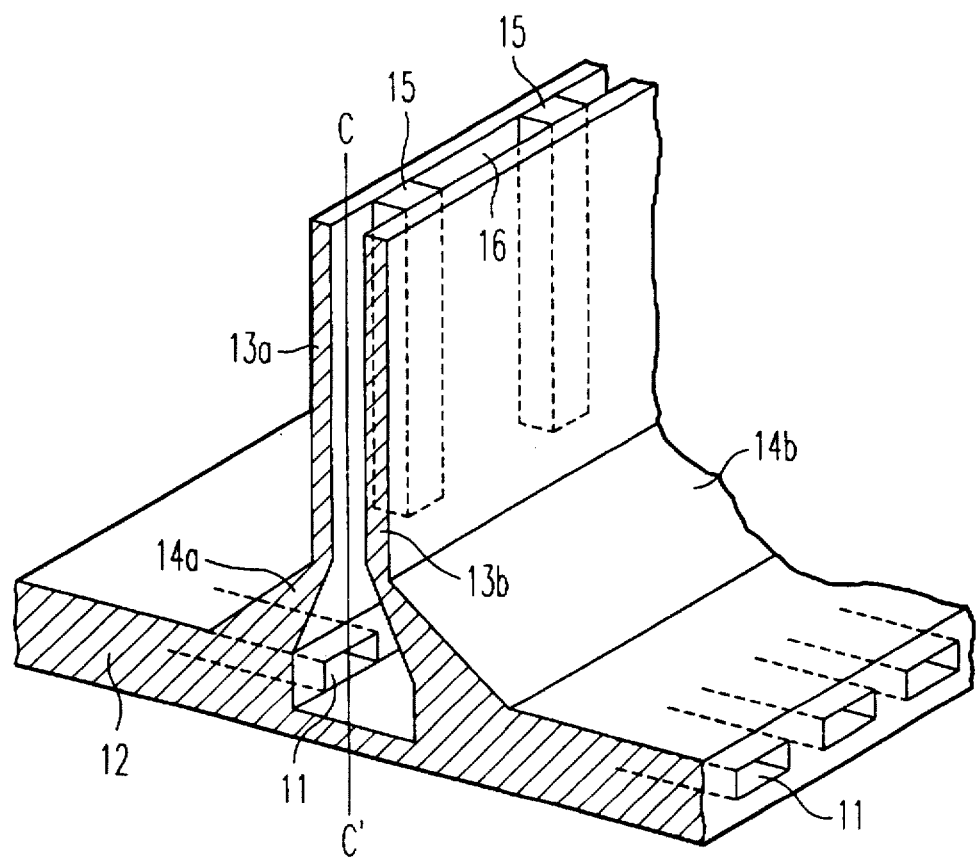

FIG. 5: representation in a cut perspective of the internal ventilated film.

FIG. 1 represents a baking ring furnace 1 made of two parallel rows 2a and 2b of juxtaposed chambers 3 of a rectangular shape separated by transversal walls 4 and subdivided into compartments 5 adapted for containing the product to be cooked. The compartments are separated by hollow partitions 6 with thin walls parallel to the major axis A, A' of the furnace in which circulates the gas used to heat the products (not shown) placed in the compartments. These hot gases may be mainly combustion gases generated by one or several burner ramps 7 that are moved from one chamber to the next as the cooking is taking place.

According to FIG. 2 the two cement basins 8a and 8b contain the chambers 3a and 3b respectively with their thermal insulations 17a and 17b. The two basins' exterior walls 9a and 9b as well as the two interior ones 10a and 10b are cooled by natural ventilation as well as the two basins' bottoms 12a and 12b equipped with circulation ducts 11a and 11b. The distance between the two external faces of the interior walls is on the order of 2 to 3 meters in order to allow a sufficient ventilation by natural draft of the two basins.

According to FIG. 3, the two parallel rows 2a and 2b of chambers 3a and 3b are placed as well as their respective thermal insulations 17a and 17b in a single cement basin 8 formed by two vertical exterior walls 9a and 9b set on a cement bottom 12. In this configuration the frequency of maintenance problems of the central bricks is a lot higher than the one of bricks of chambers having their individual basins which independently of the higher maintenance cost can lead to a limitation of production capacity.

It is to be noted nonetheless that for equal production capacity, the reduced width of a single basin furnace by about 3 meters compared to a double basin one allows a reduction of used floor space of 300 to 600 m$^2$ according to the length of the furnace.

According to FIGS. 4 and 5 showing a baking ring furnace with the central ventilated partition of the invention, we interpose between the thermal insulations 17a and 17b of the chambers 3a and 3b, and more precisely between the central bricks, a central vertical partition 10, preferably made of (defined by) cement, the total width of which varies according to the furnace capacity and more precisely according to the importance of the thermal flows to be evacuated, but also to the nature of the material used and notably of its thermodynamic characteristics, resistance to crushing, thermal shock, and thermal conductivity. This partition 10 has a total width in its central and higher parts of between 200 and 900 mm and preferably 400 and 600 mm. It generally widens progressively in its base at the bottom of the basin 12. The partition 10, usually made of the same cement as the basin 8, is made preferably by two vertical walls 13a and 13b of preferably identical width, symmetrical compared to the vertical axis CC'. Those walls 13a and 13b fixed at their lower ends 14a and 14b to the basin 12 are maintained at fixed intervals "e" by spacers preferably, vertical or horizontal, 15 of rectangular section comprising between 2 and 10 dm$^2$ placed at regular intervals between the two walls in order to limit deformation but also to form vertical or horizontal passages 16 communicating at their ends with ventilation means not shown, the ventilation being natural, forced or mix.

The width between the two walls defined by the vertical or horizontal spacers 15 is preferably between 50 and 500 mm but more preferably between 100 and 300 mm, in order to insure a sufficient ventilation in a minimum volume. The space between the spacers 15 is determined according to the deformation constraints that those walls undergo and notably the load and temperature constraints. This space more often comprises between 0.5 and 1 meter.

According to this new configuration, the cooled interior partition 10 with its limited width doesn't lead, all other things being constant, to an important increase in size of the baking ring furnace, as it is the case with the double basin one. Nevertheless, being cooled naturally, or by forced air ventilation, or by a cooling fluid, it allows the mechanical and thermal symmetry that the single basin lacks.

The ventilation choice mainly depends on the importance of the thermal flow to be evacuated from the central zone of the furnace in order to limit the temperature peaks in the bricks. For a high capacity furnace, it will be more advantageous to install a forced ventilation system, powerful enough to inject cool air, preferably from the bottom to the top of the vertical passages 16 of the interior partition 10, eventually using the ventilation ducts 11 of the basin and keeping for the exterior walls 9a and 9b a natural ventilation.

The forced ventilation can also be realized by injection of cool air in the horizontal passages 16, that is to say longitudinally from one end of the interior partition 10 to the other. The injection of cool air by blowing or aspiration is done using appropriate mechanical means such as fans or extractors situated at one end of the furnace.

For the cumulated advantages mentioned above, this new concept of baking ring furnace can be obviously used in the construction of new furnaces whether they are open or closed but it also has interesting application in the transformation of existing furnaces the performances of which need to be improved during a renovation campaign.

Thus, in the case of an open double basin furnace that needs to be renovated, one can easily, for the same amount of floor space, connect the two basin's bottoms 12a and 12b and move the 2 internal walls 10a and 10b closer so that they act as the walls 13a and 13b simply keeping enough space to form an air circulation chimney 16 which can communicate in its lower part with the existing circulation ducts 11. One can therefore increase the width of the 2 rows of chambers between 1 and 2 meters and consequently the volume of the load to be cooked of 10 to 20%.

In the same manner, a closed single basin furnace can be transformed into an open furnace one for example in order to increase its capacity. It is possible to do this without increasing the floor space by applying the concept of the invention which includes interposing an internal ventilated partition 10 the width of which comprises preferably between 400 and 600 mm and linked to the bottom of the basin 12 according to the invention. The central partition occupying only a small portion of the useful volume of the closed furnace basin, one benefits totally from the increased production capacity given by the open furnace thanks to its better ratio volume of the load to be cooked/bricks volume with a constant floor space.

A preferred method for cooking carbonaceous compounds comprises heating said compounds in an invention oven, particularly using forced ventilation of cooling air, preferably from the top of the vertical passages (e.g., 16) of interior partition (10) and optionally eventually using ventilation ducts (e.g., 11) of the basin. Exterior walls (e.g., 9a, 9b) are preferably cooled by natural ventilation.

This application is based on French Patent Application 95 01186 filed Jul. 27, 1995, incorporated herein by reference.

What is claimed as new and desired to be secured by Letters Patent of the United States is:

1. A baking ring furnace comprising two parallel rows of cooking chambers (3a) and (3b) placed with their own thermal insulation layer (17a) and (17b) jointly or separately in a basin (8), said basin having a bottom equipped with cooling ducts and having exterior walls (9a) and (9b) which are cooled by ventilation, wherein the two parallel rows of cooking chambers are separated by an interior partition which is attached to the bottom of the basin and which is in communication with said cooling ducts for cooling of the basin.

2. The baking ring furnace according to claim 1, wherein the interior partition comprises a network of vertical, horizontal or any other geometric shaped ducts allowing the circulation of a cooling liquid or gaseous fluid.

3. The baking ring furnace according to claim 1, wherein the interior partition comprises two vertical walls of identical thickness, attached at their lower ends to the bottom of the basin and maintained at a fixed distance from each other by vertical or horizontal spacers placed at fixed intervals in order to create vertical or horizontal passages.

4. The baking ring furnace according to claim 3, wherein the interior partition has a total width in its central and top parts of between 200 and 900 mm.

5. The baking ring furnace according to claim 3, wherein the distance between the two walls is 50 mm–500 mm.

6. The baking ring furnace according to claim 3, wherein the fixed interval between the spacers is between 0.5 and 1 meter.

7. The baking ring furnace according to claim 3, wherein the walls and basin are made of the same cement.

8. The baking ring furnace according to claim 1, wherein the cooling of the interior partition is insured by circulation of air in passages communicating at their ends with ventilation means, said ventilation being natural, forced or a combination thereof.

9. A method of cooking carbonaceous compounds, comprising:

heating a carbonaceous compound in a baking ring furnace comprising two parallel rows of cooking chambers (3a) and (3b) containing said carbonaceous compound and each cooking chamber placed with its own thermal insulation layer (17a) and 17b) jointly or separately in a basin (8), said basin having a bottom equipped with cooling ducts and having exterior walls (9a) and (9b) which are cooled by ventilation, wherein the two parallel rows of cooking chambers are separated by an interior partition which is attached to the bottom of the basin and which is in communication with said cooling ducts for cooling of the basin; and cooling the basin component of said baking ring furnace by injecting air through said cooling ducts which are in communication with said interior partition which divides said cooking chambers and by ventilating said exterior walls.

10. The method of claim 9, wherein said air is injected into cooling ducts which are horizontal.

11. The method of claim 9, wherein injection is accomplished by blowing or aspiration means situated at an end of the furnace.

* * * * *

UNITED STATES PATENT AND TRADEMARK OFFICE
CERTIFICATE OF CORRECTION

PATENT NO. : 5,779,970
DATED : JULY 14, 1998
INVENTOR(S) : FRANCOIS CHARMIER, ET AL.

It is certified that error appears in the above-identified patent and that said Letters Patent is hereby corrected as shown below:

Column 2, line 66 "B,B'" should read --2.,2.--.

Signed and Sealed this

Twenty-fifth Day of May, 1999

Attest:

Q. TODD DICKINSON

*Attesting Officer*    *Acting Commissioner of Patents and Trademarks*